United States Patent
Nazemi et al.

(10) Patent No.: US 11,087,119 B2
(45) Date of Patent: Aug. 10, 2021

(54) FACIAL DETECTION AND RECOGNITION FOR PEDESTRIAN TRAFFIC

(71) Applicant: Gatekeeper Security, Inc., Sterling, VA (US)

(72) Inventors: Jonathan Nazemi, Doylestown, PA (US); Christopher A. Millar, Reston, VA (US); Robert Rozploch, Newtown, PA (US)

(73) Assignee: Gatekeeper Security, Inc., Sterling, VA (US)

( * ) Notice: Subject to any disclaimer, the term of this patent is extended or adjusted under 35 U.S.C. 154(b) by 240 days.

(21) Appl. No.: 15/981,694

(22) Filed: May 16, 2018

(65) Prior Publication Data

US 2019/0354749 A1 Nov. 21, 2019

(51) Int. Cl.
*G06K 9/00* (2006.01)
*G06K 9/32* (2006.01)
(Continued)

(52) U.S. Cl.
CPC ....... *G06K 9/00288* (2013.01); *G06K 9/3241* (2013.01); *G07C 9/37* (2020.01); *G07C 9/38* (2020.01); *G08B 13/1965* (2013.01); *G08B 13/19656* (2013.01); *G08B 13/19682* (2013.01); *G08B 13/19691* (2013.01)

(58) Field of Classification Search
None
See application file for complete search history.

(56) References Cited

U.S. PATENT DOCUMENTS

| | | | | |
|---|---|---|---|---|
| 5,343,390 | A | * 8/1994 | Doi | G16H 50/20 |
| | | | | 382/132 |
| 7,305,108 | B2 | * 12/2007 | Waehner | G06K 9/00221 |
| | | | | 340/5.53 |

(Continued)

FOREIGN PATENT DOCUMENTS

WO 2015/0120413 A1 8/2015

OTHER PUBLICATIONS

PCT International Search Report and Written Opinion dated Sep. 5, 2019, issued during the prosecution of PCT International Patent Application No. PCT/US2019/031755.

*Primary Examiner* — Feng Niu
(74) *Attorney, Agent, or Firm* — Locke Lord LLP; Joshua L. Jones; Gabrielle L. Gelozin (57) ABSTRACT

A method for facial analytics includes capturing a series of images of individuals from a camera into a circular buffer and selecting a plurality of images from the buffer for analysis in response to a trigger event, wherein the plurality of images are chronologically proximate before and/or after the trigger event in time. The method includes analyzing the plurality of images to determine image quality and selecting one of the plurality of images based on image quality to form a cropped facial image most likely to result in positive facial recognition matching. Methods of signaling to control the pedestrian traffic flow can maximize the individuals' facial alignment to the capturing camera's field of view. Non-relevant facial images associated with individuals outside a given region of interest can be discarded. Facial recognition is run on the resultant cropped facial image. Output can be displayed with information from the facial recognition.

22 Claims, 4 Drawing Sheets

(51) Int. Cl.
  *G08B 13/196* (2006.01)
  *G07C 9/37* (2020.01)
  *G07C 9/38* (2020.01)

(56) References Cited

U.S. PATENT DOCUMENTS

| | | | | |
|---|---|---|---|---|
| 7,792,970 | B2* | 9/2010 | Bigioi | H04N 1/00145 |
| | | | | 709/202 |
| 8,028,903 | B1* | 10/2011 | Daniel | G06K 19/07 |
| | | | | 235/380 |
| 8,254,647 | B1* | 8/2012 | Nechyba | G06K 9/036 |
| | | | | 382/118 |
| 8,604,901 | B2* | 12/2013 | Hoyos | G06K 9/00885 |
| | | | | 340/5.52 |
| 8,861,802 | B2* | 10/2014 | Bedros | G06K 9/00221 |
| | | | | 382/118 |
| 9,087,204 | B2* | 7/2015 | Gormley | H04L 63/0861 |
| 9,189,680 | B2* | 11/2015 | Komatsu | G06K 9/00288 |
| 9,292,754 | B2* | 3/2016 | Shin | G06K 9/00288 |
| 9,396,595 | B1* | 7/2016 | Daniel | G07C 9/257 |
| 9,460,598 | B2* | 10/2016 | Noone | G08B 13/248 |
| 9,600,712 | B2* | 3/2017 | Jin | G06K 9/6289 |
| 9,613,258 | B2* | 4/2017 | Chen | G06K 9/00221 |
| 9,667,627 | B2* | 5/2017 | Gormley | G07C 9/20 |
| 9,953,149 | B2* | 4/2018 | Tussy | G06Q 20/40145 |
| 10,146,797 | B2* | 12/2018 | Bataller | G06F 16/583 |
| 10,262,126 | B2* | 4/2019 | Tussy | G06K 9/22 |
| 10,839,200 | B2* | 11/2020 | Nazemi | G06K 9/00255 |
| 2004/0070679 | A1* | 4/2004 | Pope | H04N 5/772 |
| | | | | 348/231.99 |
| 2005/0063566 | A1* | 3/2005 | Beek | A61B 5/1077 |
| | | | | 382/115 |
| 2005/0105806 | A1* | 5/2005 | Nagaoka | G06F 16/583 |
| | | | | 382/224 |
| 2006/0018522 | A1* | 1/2006 | Sunzeri | G06F 16/583 |
| | | | | 382/118 |
| 2006/0117186 | A1* | 6/2006 | Yeo | G07B 15/02 |
| | | | | 713/182 |
| 2006/0146062 | A1* | 7/2006 | Kee | G06K 9/6212 |
| | | | | 345/582 |
| 2006/0284982 | A1* | 12/2006 | Bigioi | H04N 1/00145 |
| | | | | 348/207.1 |
| 2007/0133844 | A1 | 6/2007 | Waehner et al. | |
| 2009/0023472 | A1 | 1/2009 | Yoo et al. | |
| 2009/0080715 | A1 | 3/2009 | van Beek et al. | |
| 2013/0129159 | A1* | 5/2013 | Huijgens | G06K 9/00973 |
| | | | | 382/118 |
| 2013/0176285 | A1* | 7/2013 | Sato | G06T 11/60 |
| | | | | 345/204 |
| 2013/0202274 | A1* | 8/2013 | Chan | H04N 7/185 |
| | | | | 386/362 |
| 2013/0251214 | A1* | 9/2013 | Chung | G06K 9/00161 |
| | | | | 382/116 |
| 2013/0266193 | A1* | 10/2013 | Tiwari | G06F 16/5854 |
| | | | | 382/115 |
| 2014/0044348 | A1* | 2/2014 | Chen | G06K 9/00221 |
| | | | | 382/159 |
| 2014/0063177 | A1* | 3/2014 | Tian | H04N 7/147 |
| | | | | 348/14.07 |
| 2014/0132746 | A1* | 5/2014 | King | H04N 1/215 |
| | | | | 348/65 |
| 2014/0254890 | A1* | 9/2014 | Bergman | G08B 13/248 |
| | | | | 382/118 |
| 2015/0186711 | A1* | 7/2015 | Baldwin | G06F 21/32 |
| | | | | 382/118 |
| 2015/0347860 | A1* | 12/2015 | Meier | G06K 9/3241 |
| | | | | 382/140 |
| 2015/0357000 | A1* | 12/2015 | Howell | G11B 27/34 |
| | | | | 386/241 |
| 2016/0026855 | A1 | 1/2016 | Mazumdar et al. | |
| 2016/0063235 | A1* | 3/2016 | Tussy | H04W 12/06 |
| | | | | 726/6 |
| 2016/0171808 | A1* | 6/2016 | Caterino | G07C 9/00309 |
| | | | | 340/5.61 |
| 2016/0178936 | A1* | 6/2016 | Yang | G06T 11/60 |
| | | | | 351/246 |
| 2018/0018351 | A1* | 1/2018 | Fagans | G06F 16/5866 |
| 2018/0082131 | A1* | 3/2018 | Li | G06K 9/00771 |
| 2018/0089528 | A1* | 3/2018 | Chan | G06K 9/4604 |
| 2018/0181737 | A1* | 6/2018 | Tussy | G06F 21/32 |
| 2018/0189551 | A1* | 7/2018 | Ranganath | G06K 9/6215 |
| 2018/0196587 | A1* | 7/2018 | Bialynicka-Birula | |
| | | | | G06T 3/0093 |
| 2019/0089934 | A1* | 3/2019 | Goulden | G08B 13/19684 |
| 2019/0354750 | A1* | 11/2019 | Nazemi | G06K 9/00255 |

* cited by examiner

FACIAL DETECTION AND RECOGNITION FOR PEDESTRIAN TRAFFIC

BACKGROUND OF THE INVENTION

1. Field of the Invention

The present disclosure relates to facial detection and recognition, and more particularly to facial detection and recognition for pedestrian traffic such as in queues for customs and immigration in airports, border crossings, or the like.

2. Description of Related Art

The need to ensure national security includes a need to accurately identify travelers entering and leaving the country, whether by air, land, sea, or on foot. The traditional identification process involved an officer comparing a photograph in a travel document such as a passport to the bearer's face, which has been required of travelers entering and exiting the country. There are no traditional techniques for automating this task, and there are no traditional techniques that can swiftly identify the bearer of a travel document as being on a terror watch list, a no-fly list, or the like based on facial recognition. Traditional systems for automated facial recognition would present a challenge in settings like customs and emigration in airports, since they require posing for a camera which is not conducive to high throughput queuing in modern airports. Latency in traditional facial recognition systems would also present a problem in the setting of high-throughput queuing.

The conventional techniques have been considered satisfactory for their intended purpose. However, there is an ever present need for improved facial detection and recognition. This disclosure provides a solution for this need.

SUMMARY OF THE INVENTION

A method for facial analytics includes capturing a series of images of individuals from a camera into a buffer and selecting a plurality of images from the buffer for analysis in response to a trigger event, wherein the plurality of images are chronologically proximate the trigger event in time. The method includes analyzing the plurality of images to determine image quality and selecting one of the plurality of images based on image quality to form a cropped facial image. Facial recognition is run on the cropped facial image. The method includes displaying output to a user with information from the facial recognition on the cropped facial image.

Analyzing the plurality of images can include ranking the plurality of images based on factors most likely to achieve facial recognition, wherein selecting one of the plurality of images includes selecting based on highest rank. Capturing the series of images into the buffer can include use of a constantly-running circular buffer which deletes older images to accommodate new images. The method can include using facial detection on the series of images to identify a region of interest and to filter out and discard images of faces detected behind an individual at the front of a queue of the individuals.

The method can include changing an image on a display to signal to an individual at the front of a queue of the individuals that it is time to advance, wherein the display is positioned to align the individual's face with the camera when the display holds the individual's attention to facilitate proper facial angle for facial detection and facial recognition. The triggering event can include changing the image on the display.

Analyzing the plurality of images can include running the plurality of images through facial detection, wherein capturing the series of images into the buffer, selecting a plurality of images from the buffer, analyzing the plurality of images, selecting one of the plurality of images based on image quality, and running facial recognition are all performed within a local network physically located on site with the individuals being imaged. The local network can include a database of facial recognition data for persons-of-interest, wherein the local network is connected to the internet and/or a Wide-Area Network (WAN) for updates to the database from time to time from one or more remote sources that are not on site with the individuals being imaged. Of the series of images captured, only the cropped facial image need be sent to a central server on the local network to reduce bandwidth requirements and memory storage between the camera and the central server, wherein running facial recognition on the cropped facial image is performed in the central server. The database of facial recognition data for persons-of-interest can include facial recognition data for individuals on at least one of a terror watch list, a no-fly list, or a previous image of the individual captured at an earlier point of their journey, such as a departure location before arrival at their current entry location.

The method can include receiving input from the user verifying that the cropped facial image matches travel documents offered by the individual in the cropped facial image. The individuals can be pedestrians queued in a lane. Capturing a series of images of individuals can be performed without manual interaction and without requiring posing. Non-relevant facial images associated with individuals outside a given region of interest, or which are determined to be occluded or are behind the primary next-in-queue individual, can be discarded. Capturing a series of images can include capturing only still images without capturing video images. The method can include displaying information to the user for validating an individual's travel documents against the cropped facial image.

A system for facial analytics includes a plurality of officer desks wherein each officer desk includes a camera, a controller operatively connected to the camera to capture images of individuals; and a buffer operatively connected to the controller and camera. The controller includes machine readable instructions configured to cause the controller to perform any method of facial analytics as described above. The system also includes a central server on a local network, wherein each of the controllers is connected to the local network, wherein the central server is configured to run facial recognition on the cropped facial images from each officer desk.

The system can include a respective queue display at each officer desk configured to signal an individual at the front of a queue of individuals that it is time to advance, wherein the queue display and camera are positioned to align the individual's face with the camera when the display holds the individual's attention to facilitate proper facial angle for facial detection and facial recognition. A user display can be operatively connected to the central server to display output regarding facial recognition of the cropped facial image to a user.

A method for facial analytics includes at a departure location, receiving travel document information into a departure system for an individual departing from the departure location, transmitting the travel document information from the departure system to an arrival system at an arrival location. The method includes at the arrival location, receiving travel document information into the arrival system and displaying output to a user with travel document information from the departure location and from the arrival location for the individual for verification.

At the arrival location the method can include capturing a series of images of the individual from a camera into a buffer, selecting a plurality of images from the buffer for analysis in response to a trigger event, wherein the plurality of images are chronologically proximate the trigger event in time, analyzing the plurality of images to determine image quality, selecting one of the plurality of images based on image quality to form a cropped facial image, and running facial recognition on the cropped facial image, wherein displaying output to a user includes displaying output to the user with information from the facial recognition on the cropped facial image.

At the departure location the method can include capturing a series of images of the individual from a camera into a buffer, selecting a plurality of images from the buffer for analysis in response to a trigger event, wherein the plurality of images are chronologically proximate the trigger event in time, analyzing the plurality of images to determine image quality, selecting one of the plurality of images based on image quality to form a cropped facial image, running facial recognition on the cropped facial image, and transmitting information from the facial recognition from the departure location to the arrival system, wherein displaying output to a user includes displaying output to the user with information from the facial recognition on the cropped facial image.

It is also contemplated that at each of the departure location and the arrival location the method can include capturing a series of images of the individual from a camera into a buffer, selecting a plurality of images from the buffer for analysis in response to a trigger event, wherein the plurality of images are chronologically proximate the trigger event in time, analyzing the plurality of images to determine image quality, selecting one of the plurality of images based on image quality to form a cropped facial image, running facial recognition on the cropped facial image, and transmitting information from the facial recognition from the departure location to the arrival system, wherein displaying output to a user includes displaying output to the user with information from the facial recognition on: the cropped facial image from the departure system and the cropped facial image from the arrival system. Displaying output to a user can include displaying output to the user including four images: the cropped facial image from the departure system, the cropped facial image from the arrival system, a travel document image from the departure system, and a travel document image from the arrival system.

A system for facial analytics includes a departure system at a departure location configured to receive travel document information into the departure system for an individual departing from the departure location. The system also includes an arrival system at an arrival location, wherein the arrival system is operatively connected to the departure system by at least one of the internet or a Wide-Area Network (WAN) to transmit the travel document information from the departure system to the arrival system. The arrival system includes is a system as described above including a camera, controller, and other components as described above.

The departure system can also be a system as described above, including a camera, controller, and other components as described above, and can be configured to transmit the cropped facial image with the travel document information from the departure system to the arrival system. The controller of the arrival system can include machine readable instructions configured to cause it to display output to the user of the arrival system including four images: the cropped facial image from the departure system, the cropped facial image from the arrival system, a travel document image from the departure system, and a travel document image from the arrival system.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
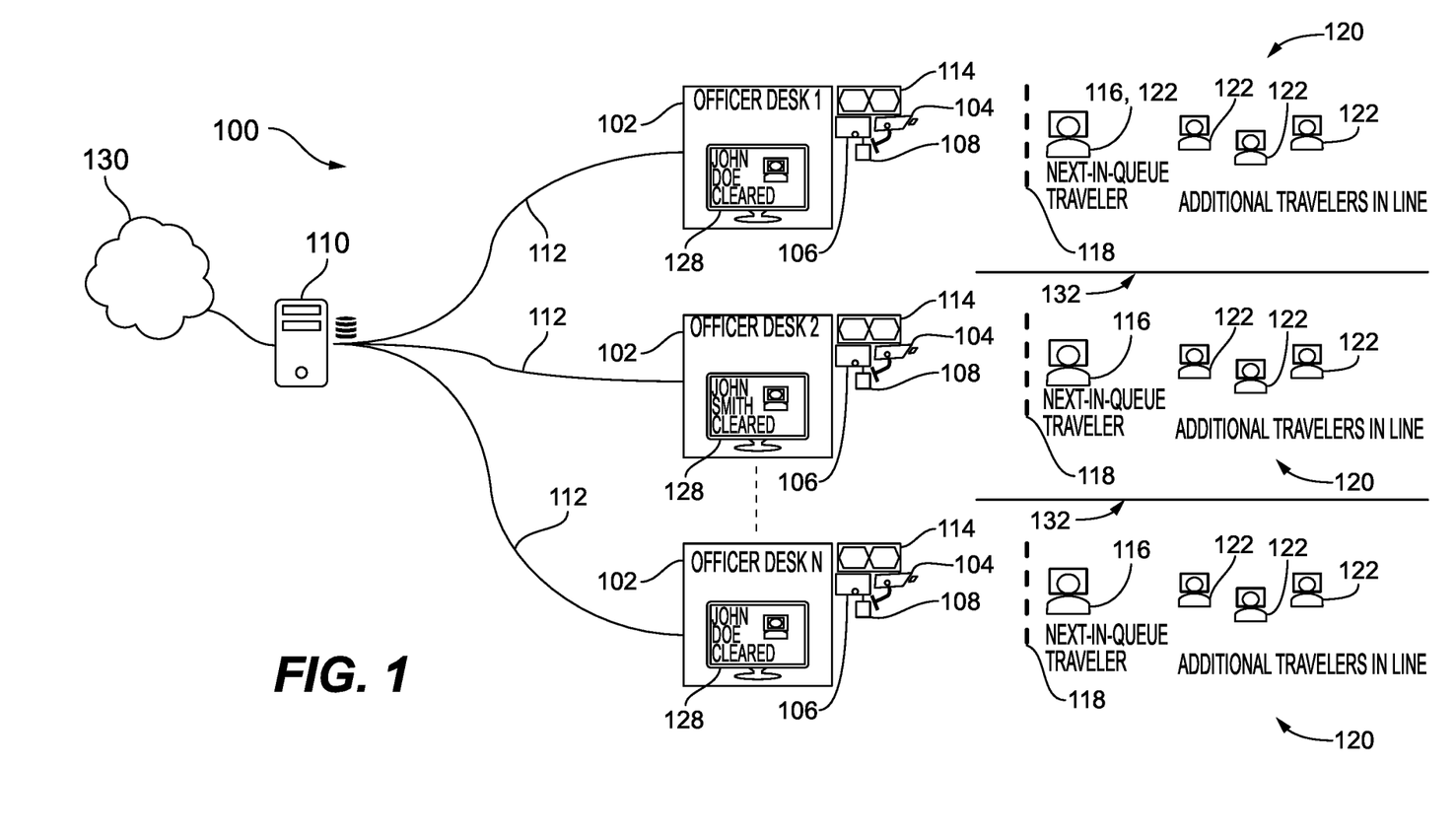
FIG. 1 is a schematic view of an exemplary embodiment of a system constructed in accordance with the present disclosure, showing the officer desks connected through a local network to a central server.

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to provide low-latency, high through put queuing with automated image capture for facial recognition to assist with identifying individual pedestrians, such as at customs and immigration in airports.

The system 100 for facial analytics includes a plurality of officer desks 102. Three officer desks 102 are shown in FIG. 1, however those skilled in the art will readily appreciate that any suitable number of officer desks 102 can be used, including one, without departing from the scope of this disclosure. Each officer desk 102 includes a camera 104, a controller 106 operatively connected to the camera 104 to capture images of individuals, and a buffer 108 operatively connected to the controller 106 and camera 104. The buffer 108 can be an amount of memory allocated within the same device as the controller, or can be located in an external memory device. The controller 106 includes machine readable instructions configured to cause the controller 106 to perform any method of facial analytics as described below. The system 100 also includes a central server 110 on a local network wherein each of the controllers 106 is connected to the local network, as indicated by the network lines 112 in FIG. 1. Those skilled in the art will readily appreciate that the network lines 112 can be hard-wire connections, or wireless connections. The central server 110 is configured to run facial recognition on the cropped facial images from each officer desk 102.

Figure 2:
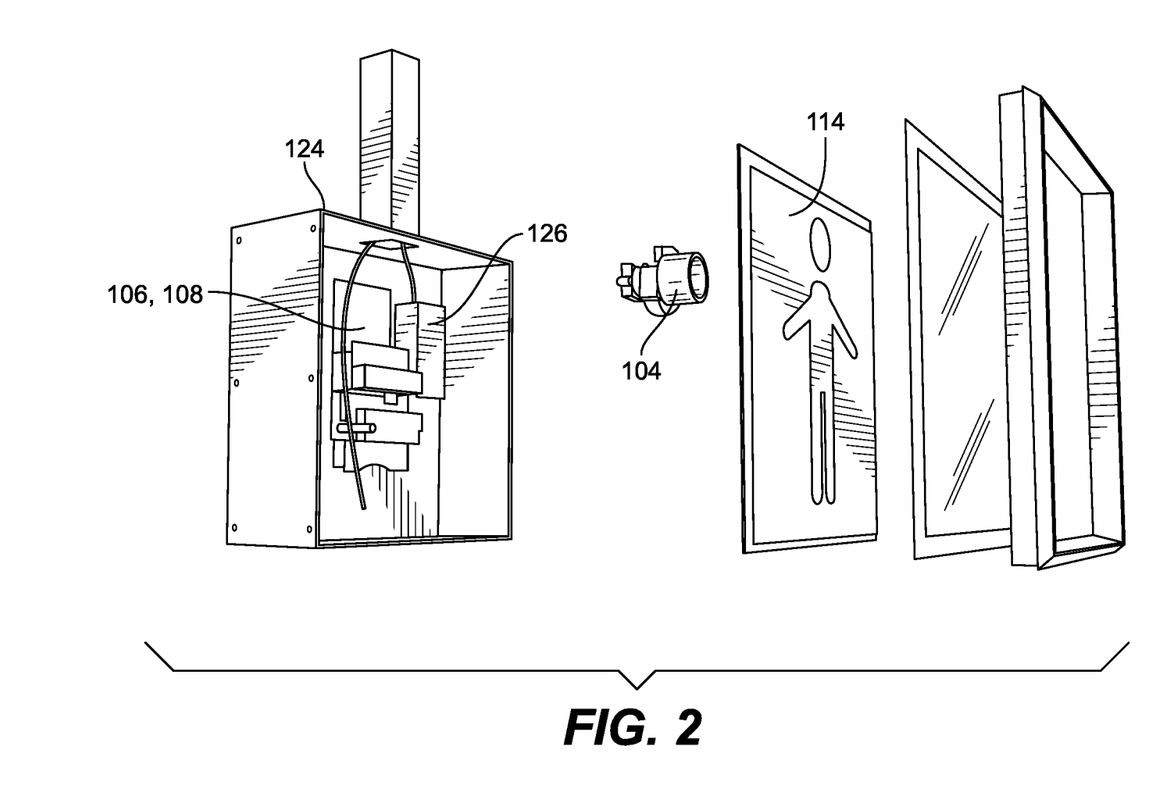
FIG. 2 is an exploded perspective view of a portion of the system of FIG. 1, showing the camera, controller, and queuing display.
Figure 3:
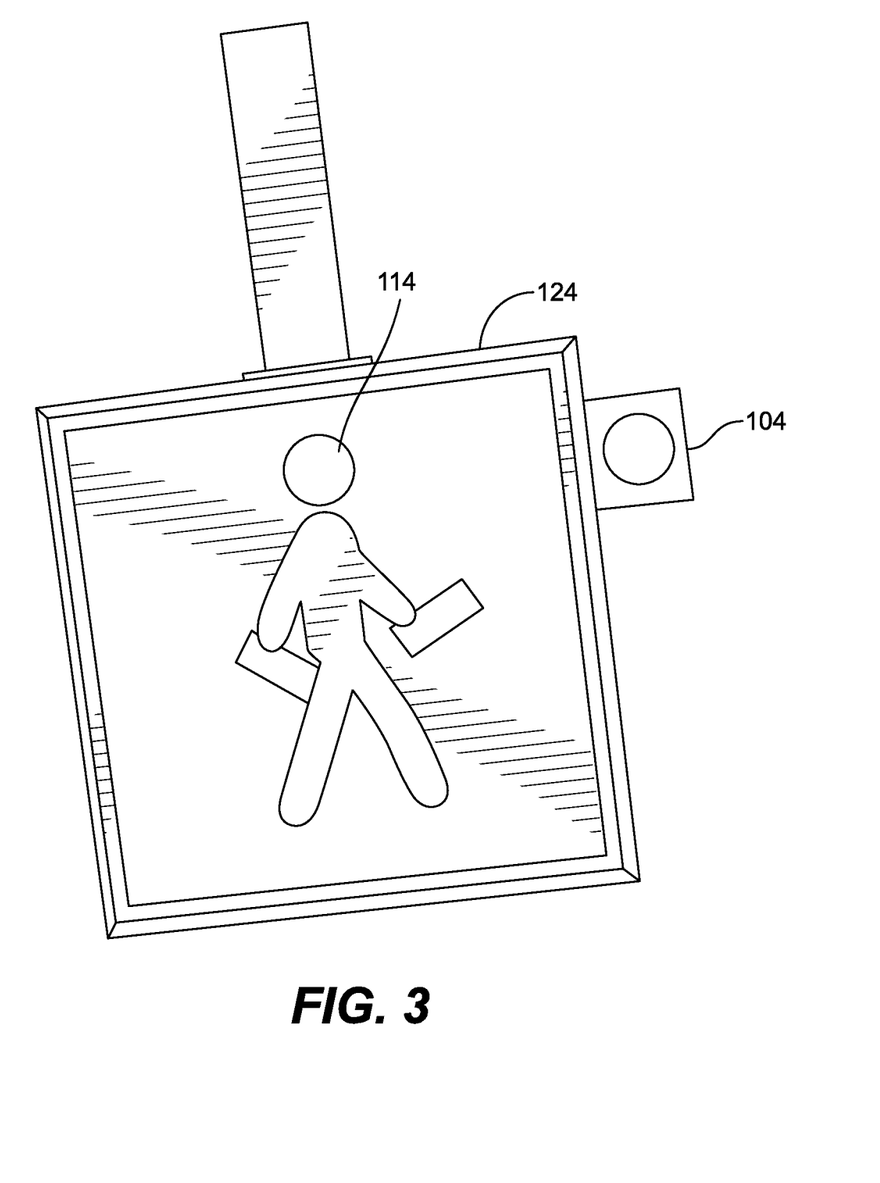
FIG. 3 is a perspective view of the portion of the system of FIG. 1, showing the queueing display.

The system includes a respective queue display 114 at each officer desk 102 configured to signal an individual 116 at the front 118 of a queue 120 of individuals 122 when it is time to advance to the respective officer desk 102. The queue display 114 can display a red light, or a figure or a person standing (as shown in FIG. 2), or the like, to indicate that the individual 116 should wait. When it is time for the individual 116 to advance to the officer desk 102, the queue display 114 can display a green light, a figure of a person walking (as shown in FIG. 3), or the like. FIG. 2 shows a housing 124 into which the controller 106 (which can include the memory for the buffer 108), a power supply 126, and the queue display 114 (e.g., an LED display or the like).

The camera 104 can be mounted on or near the housing 124 as shown in FIG. 3. The queue display 114 and camera 104 are thus positioned to align the face of the individual 116 with the camera 104 when the display 114 is holding the attention of the individual 116 to facilitate proper facial angle for facial detection and facial recognition.

With reference again to FIG. 1, a user display 128 at each officer desk 102 is operatively connected to the central server 110 to display output from the central server 110 regarding facial recognition of a cropped facial image of the individual 116 to a user, such as a customs officer at the officer desk 102. The user display 128 can inform the user whether the individual 116 is cleared, or whether they are a facial recognition match for an individual in the database of the central sever.

The local network includes a database, e.g., within the central sever 110, of facial recognition data for persons-of-interest. The database of facial recognition data for persons-of-interest includes facial recognition data for individuals on at least one of a terror watch list, a no-fly list, a previous image of the individual captured at an earlier point of their journey, such as a departure location before arrival at their current entry location, or any other suitable list. The local network is connected to the internet 130 and/or a Wide-Area Network (WAN) for updates to the database from time to time from one or more remote sources that are not on site with the individuals 116, 122 being imaged.

A method for facial analytics includes capturing a series of images of individuals from a camera, e.g., camera 104, into a buffer, e.g., in controller 106, and selecting a plurality of images from the buffer for analysis in response to a trigger event, wherein the plurality of images are chronologically proximate before and/or after the trigger event in time. For example, the trigger event can be when the queue display 114 changes or shortly thereafter, and the plurality of images selected from the buffer can include one or more images captured just before the triggering event, one or more images captured just after the triggering event, or both. The method includes analyzing the plurality of images to determine image quality and selecting one of the plurality of images based on image quality to form a cropped facial image. The cropped facial image can be sent over the local network to the central server. Facial recognition is run on the cropped facial image, e.g., within the central server 110. The method includes displaying output, e.g., from the central server, to a user with information from the facial recognition on the cropped facial image.

Analyzing the plurality of images can include ranking the plurality of images based on factors most likely to achieve facial recognition, wherein selecting one of the plurality of images includes selecting based on highest rank. For example, the image with characteristics most likely to result in successful facial recognition can be chosen from the plurality of images of the individual 116. Capturing the series of images into the buffer, e.g., buffer 108, can include using of a constantly-running circular buffer which deletes older images to accommodate new images. The method can include using facial detection on the series of images to identify a region of interest and to filter out and discard images of faces detected behind an individual 116 at the front of a queue of the individuals 120.

Capturing the series of images into the buffer, selecting a plurality of images from the buffer, analyzing the plurality of images, selecting one of the plurality of images based on image quality, and running facial recognition can all be performed within a local network physically located on site with the individuals being imaged. More particularly, these can all be performed locally on the controllers 108 and buffers 108 at each officer desk 102, so that of the series of images captured, only the cropped facial image for each individual 116 who comes to the front of the queue is sent to a central server 110 on the local network to reduce bandwidth requirements between the camera 104 and the central server 110. By sending only the most relevant cropped facial images, memory storage requirements can be minimized as well. Running facial recognition is also performed on each cropped facial image locally in the central server without the need to send data over the internet 130 for each individual 116 that reaches the front of the queue.

The method can include receiving input from the user, e.g. a customs officer using a touch screen of display 128, verifying that the cropped facial image matches travel documents offered by the individual 116 in the cropped facial image. The individuals 116, 122 can pedestrians queued in a lane such as a marked lane 132 in an airport or border crossing.

Capturing a series of images of individuals 116 is performed without manual interaction and without requiring posing. There is no kiosk required to obtain quality cropped facial images. These factors mean that a system 100 can be installed on existing infrastructure, and when operating, high-throughput queuing can be achieved while the facial recognition is automated. Capturing a series of images includes capturing only still images without capturing video images, and only the final cropped facial images need be sent to the central sever 110. Non-relevant facial images associated with individuals outside a given region of interest, or which are determined to be occluded or are behind the primary next-in-queue individual, can be discarded. These factors mean that bandwidth bottlenecks will not create latency for the image recognition. Additionally, by initiating the process of facial capture when the next pedestrian first becomes next-in-queue (i.e. first becomes individual 116), this provides increased time for performing all image facial detection, ranking, and facial recognition tasks in a pipeline processing approach. This results in increased processing throughput for system 100 by making the final facial recognition information available and pre-queued with the user (e.g. a customs and immigration officer) well in advance of the pedestrian approaching the user's desk.

It is also contemplated that the methods above can provide an officer the ability to pre-queue and quickly compare, e.g., on the user display 128, the Best Unique Face (BUF) obtained earlier from the traveler while waiting in line against the biographical information encoded directly on the traveler's passport. This biographical information can contain the traveler's photograph, name, and other descriptors associated with the individual. This provides an additional point of validation that the traveler's Best Unique Face (BUF) image (e.g. the cropped facial image) matches the photo on government record or as contained in the passport, either on the picture or in some form of encoded radio-frequency identification (RFID) information embedded in the passport.

Figure 4:
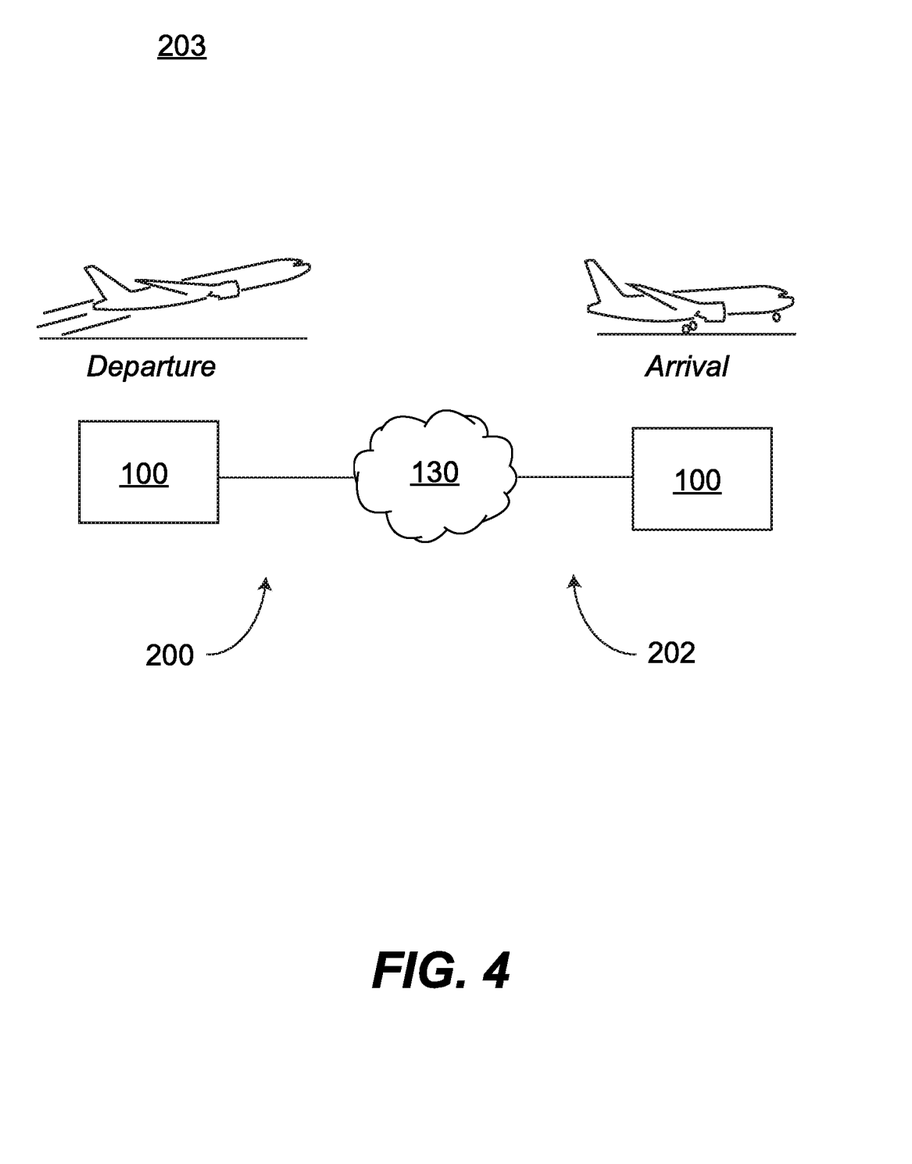
FIG. 4 is a schematic view of two of the systems of FIG. 1, showing one of the systems at a departure location, and one of the systems at an arrival location, wherein the departure system is connected to the arrival system to send information about individuals for additional verification.

With reference now to FIG. 4, it is contemplated that two systems 100 as described above, one at a departure location 200 (e.g. a security check point in an airport of departure) and one at an arrival location 202 (e.g. a customs/immigration check point in an airport of arrival) can be connected together into a larger system over the internet 130 or a Wide-Area Network (WAN). This larger system 203 can allow additional functionality to that described above. For example, a method for facial analytics includes receiving travel document information at the departure location 200 into a departure system 100 for an individual 116 (shown in FIG. 1) departing from the departure location 200. The departure system 100 transmits the travel document information over the internet 130 or WAN from the departure system 100 to the arrival system 100 which is at the arrival location 202. When the individual 116 presents travel documents to a user (e.g. a customs/immigration officer) at the arrival location 202, the travel document information can be received into the arrival system 100, which can display output to the user with travel document information for the individual 116 from the departure location 200 and from the arrival location 202 for verification. This can be used, for example, to detect if an individual 116 changes passports at some point between the departure location 200 and the arrival location 202.

Each of the departure system 100 and the arrival system 100 can respectively include the same components described above with respect to FIGS. 1-3. The departure system 100 can transmit its cropped facial image of the individual 116 to the arrival system, where displaying output to the user on the arrival system 100 includes displaying output to the user with information from the facial recognition on the cropped facial image from the departure system 100 and/or from the arrival system 100. For example, if an officer at the arrival location 202 sees cropped facial images from both the arrival location 202 and the departure location 200, the officer can verify that the individual 116 bearing a passport at the arrival location 202 is the same individual 116 who presented the passport at the departure location 200. At the arrival location 202, displaying output to a user can include displaying output to the user including four images: the cropped facial image from the departure system 100, the cropped facial image from the arrival system 100, a travel document image from the departure system 100, and a travel document image from the arrival system 100. This can allow the officer to verify that the individual 116 and their passport have not changed between the arrival location 202 and the departure location 200, for example.

The methods and systems of the present disclosure, as described above and shown in the drawings, provide for facial analytics with superior properties including automated image capture, low-latency facial recognition, and high-throughput queueing. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method for facial analytics comprising:
   capturing a series of still images of individuals from a camera into a buffer;
   selecting a plurality of images from the buffer for analysis in response to a trigger event, wherein the plurality of images are chronologically proximate the trigger event in time and include still images from the buffer captured before the trigger event, wherein the trigger event includes a queue display changing to hold attention of the individual to align the face of the individual with the camera;
   analyzing the plurality of images to determine image quality;
   selecting one of the plurality of images based on image quality to form a cropped facial image;
   running facial recognition on the cropped facial image; and
   displaying output to a user with information from the facial recognition on the cropped facial image.

2. The method as recited in claim 1, wherein analyzing the plurality of images includes ranking the plurality of images based on factors most likely to achieve facial recognition, and wherein selecting one of the plurality of images includes selecting based on highest rank.

3. The method as recited in claim 1, wherein capturing the series of images into the buffer includes use of a constantly-running circular buffer which deletes older images to accommodate new images.

4. The method as recited in claim 1, further comprising using facial detection on the series of images to identify a region of interest and to filter out and discard images of faces detected behind an individual at the front of a queue of the individuals.

5. The method as recited in claim 1, further comprising changing an image on a display to signal to an individual at the front of a queue of the individuals that it is time to advance, wherein the display is positioned to align the individual's face with the camera when the display holds the individual's attention to facilitate proper facial angle for facial detection and facial recognition.

6. The method as recited in claim 5, wherein the triggering event includes changing the image on the display.

7. The method as recited in claim 1, wherein analyzing the plurality of images includes running the plurality of images through facial detection, wherein capturing the series of images into the buffer, selecting a plurality of images from the buffer, analyzing the plurality of images, selecting one of the plurality of images based on image quality, and running facial recognition are all performed within a local network physically located on site with the individuals being imaged.

8. The method as recited in claim 7, wherein the local network includes a database of facial recognition data for persons-of-interest, wherein the local network is connected to the internet and/or a Wide-Area Network (WAN) for updates to the database from time to time from one or more remote sources that are not on site with the individuals being imaged.

9. The method as recited in claim 8, wherein the database of facial recognition data for persons-of-interest includes facial recognition data for individuals on at least one of a terror watch list, a no-fly list, or a previous image of the individual captured at an earlier point of their journey.

10. The method as recited in claim 7, wherein of the series of images captured, only the cropped facial image is sent to a central server on the local network to reduce bandwidth requirements and memory storage between the camera and the central server, wherein running facial recognition on the cropped facial image is performed in the central server.

11. The method as recited in claim 1, further comprising receiving input from the user verifying that the cropped facial image matches travel documents offered by the individual in the cropped facial image.

12. The method as recited in claim 1, wherein the individuals are pedestrians queued in a lane.

13. The method as recited in claim 1, wherein capturing a series of images of individuals is performed without manual interaction and without requiring posing.

14. The method as recited in claim 1, wherein non-relevant facial images associated with individuals outside a given region of interest, or which are determined to be occluded or are behind the primary next-in-queue individual, are discarded.

15. The method as recited in claim 1, wherein capturing a series of images includes capturing only still images without capturing video images.

16. The method as recited in claim 1, further comprising displaying information to the user for validating an individual's travel documents against the cropped facial image.

17. A system for facial analytics comprising:
a camera;
a controller operatively connected to the camera to capture still images of individuals; and
a buffer operatively connected to the controller and camera, wherein the controller includes machine readable instructions configured to cause the controller to:
capture a series of images of individuals from the camera into the buffer;
select a plurality of images from the buffer for analysis in response to a trigger event, wherein the plurality of images are chronologically proximate the trigger event in time and include still images from the buffer captured before the trigger event, wherein the trigger event includes a queue display changing to hold attention of the individual to align the face of the individual with the camera;
analyze the plurality of images to determine image quality; and
select one of the plurality of images based on image quality to form a cropped facial image for use in a facial recognition system.

18. The system as recited in claim 17, further comprising a central server on a local network, wherein the controller is connected to the local network, wherein the central server is configured to run facial recognition on the cropped facial image.

19. The system as recited in claim 17, further comprising a user display operatively connected to the central server to display output regarding facial recognition of the cropped facial image to a user.

20. The system as recited in claim 17, further comprising a queue display configured to signal an individual at the front of a queue of individuals that it is time to advance, wherein the queue display and camera are positioned to align the individual's face with the camera when the display holds the individual's attention to facilitate proper facial angle for facial detection and facial recognition.

21. A system for facial analytics comprising:
a plurality of officer desks wherein each officer desk includes:
a camera;
a controller operatively connected to the camera to capture images of individuals; and
a buffer operatively connected to the controller and camera, wherein the controller includes machine readable instructions configured to cause the controller to capture a series of still images of individuals from the camera into the buffer, select a plurality of images from the buffer for analysis in response to a trigger event, wherein the plurality of images are chronologically proximate the trigger event in time and include still images from the buffer captured before the trigger event, wherein the trigger event includes a queue display changing to hold attention of the individual to align the face of the individual with the camera, analyze the plurality of images to determine image quality, and select one of the plurality of images based on image quality to form a cropped facial image for use in a facial recognition system; and
a central server on a local network, wherein each of the controllers is connected to the local network, wherein the central server is configured to run facial recognition on the cropped facial images from each officer desk.

22. The system as recited in claim 21, further comprising a respective queue display at each officer desk configured to signal an individual at the front of a queue of individuals that it is time to advance, wherein the queue display and camera are positioned to align the individual's face with the camera when the display holds the individual's attention to facilitate proper facial angle for facial detection and facial recognition.

* * * * *